United States Patent [19]

Ireland

[11] Patent Number: 4,992,208
[45] Date of Patent: Feb. 12, 1991

[54] STABILIZATION OF SOLID SODIUM CHLORIDE AGAINST MUSHING IN AN AQUEOUS MEDIUM

[75] Inventor: Donald T. Ireland, Delano, Minn.

[73] Assignee: Cargill, Incorporated, Minneapolis, Minn.

[21] Appl. No.: 339,965

[22] Filed: Apr. 18, 1989

Related U.S. Application Data

[63] Continuation of Ser. No. 62,724, Jun. 15, 1987, abandoned.

[51] Int. Cl.$^5$ .................................................. C02F 5/14
[52] U.S. Cl. .............................. 252/363.5; 252/181; 210/673; 210/687; 210/697
[58] Field of Search ................ 252/1, 181, 363.5; 210/673, 687, 697; 426/271

[56] References Cited

U.S. PATENT DOCUMENTS

| | | | |
|---|---|---|---|
| 2,749,306 | 6/1956 | Coleman | 210/673 |
| 2,770,548 | 11/1956 | Hall et al. | 426/271 X |
| 2,784,101 | 3/1957 | Diamond | 426/271 X |
| 2,977,313 | 3/1961 | Roland | 252/99 |
| 3,099,521 | 7/1963 | Arensberg | 252/181 X |
| 3,189,554 | 6/1965 | Dean | 252/181 |
| 3,860,394 | 1/1975 | Tepas, Jr. et al. | 210/169 X |
| 3,870,471 | 3/1975 | Tepas, Jr. et al. | 210/169 X |
| 4,451,381 | 5/1984 | Heiss et al. | 252/1 |
| 4,539,106 | 9/1985 | Schwartz | 210/143 X |

OTHER PUBLICATIONS

Concise Chemical and Technical Dictionary, 4th Edition, Chemical Publishing Co. Inc., New York, p. 1048. QD5 .B4 1986.

*Primary Examiner*—Robert L. Stoll
*Assistant Examiner*—Gary L. Geist
*Attorney, Agent, or Firm*—Fitch, Even, Tabin & Flannery

[57] ABSTRACT

A method and composition are described for the prevention of the mushing or the disintegration of solid sodium chloride in an aqueous medium.

13 Claims, No Drawings

STABILIZATION OF SOLID SODIUM CHLORIDE AGAINST MUSHING IN AN AQUEOUS MEDIUM

This application is a continuation, of application Ser. No. 62,724 filed June 15, 1987, now abandoned.

This invention relates to preventing solid sodium chloride from mushing or from becoming soft and shapeless in a water medium. More particularly, this invention relates to the prevention of mushing of water conditioning pellets made from granulated sodium chloride when those pellets are in water.

"Hard" water is known as water from which an insoluble soap precipitates when a soluble sodium soap is added. Generally, this precipitate includes a mixture of calcium and magnesium soaps. As a result "hardness" often is considered to mean the total concentration of calcium and magnesium ions. The softening of water can be achieved by evaporation, precipitation, sequestration and ion exchange. The method of this invention is important to softening water by ion exchange. In ion exchange an exchange material is charged with sodium ions by contact with a solution of sodium chloride. Thereafter when hard water contacts the exchange material charged with sodium ions, the sodium ions in the exchange material are replaced with calcium and magnesium ions in the hard water. This exchange results in softening the water. When the ion exchange material has absorbed all the calcium and magnesium ions it can hold, the exchange material can be regenerated with sodium ions by contact with the salt solution. In theory the cycle of softening and regeneration can be indefinitely repeated.

Sodium chloride which is used to condition water in an ion exchange frequently is in solid pellet form. These pellets are made from granulated sodium chloride in a hydraulic press. When the pellets are used in an ion exchange water softening process, they are placed in a water medium such as a sodium chloride brine tank for ion exchange and softening water. Many times while under the water/sodium chloride brine, salt pellets will disintegrate into sodium chloride granulated particles. This phenomenon, which is known as mushing in the water conditioning and salt industries, reduces the efficiency of the use of the salt. When the pellets mush and disintegrate, the brine does not flow quickly enough to the ion exchange material for complete regeneration in times allotted therefor, bridging of the salt may occur which prevents additional salt pellets from entering the water to form saturated brine for succeeding regenerations of the ion exchange material. Further, when pellets mush granules of undissolved salt may clog water softener valves which results in poor regeneration of the ion exchange material or brine being undesirably introduced into drinking water, salt granules being flushed from the system and the salt wasted and inefficiently used. Although a number of mechanical remedies for pressing the pellets have been suggested, mushing of salt pellets in water conditioning solutions occur at a high frequency.

An object of this invention is to prevent the mushing of solid sodium chloride in water or an aqueous medium which contains substantial amounts of water.

Another object of this invention is to provide a method and composition which will increase the efficiency of the use of salt in conditioning water.

Still another object of this invention is to prevent the disintegration of pellets made from granulated sodium chloride when the pellets are in a sodium chloride solution used for conditioning water. These and other objects and advantages of the invention will become apparent from the following detailed description.

According to the invention, a method to prevent mushing of solid sodium chloride in an aqueous medium comprises mixing from about 0.01 to about 3.0 percent by weight, based upon the weight of the solid sodium chloride, of an anti-mushing agent with the solid sodium chloride or the aqueous medium. According to the invention the anti-mushing agent is selected from the group consisting of sodium hexametaphosphate, sodium metaphosphate, trisodium phosphate, sodium tripolyphosphate, disodium ethylenediaminetetraacetic acid or mixtures thereof. The anti-mushing agent may be mixed with the solid sodium chloride by dispersing it as a powder on the sodium chloride or spraying a solution of the anti-mushing agent on the sodium chloride. Alternatively, the anti-mushing agent may be provided in solution as a part of the aqueous medium. When the sodium chloride is granulated and pelletized for use such as in water conditioning, the anti-mushing agent may be mixed into the sodium chloride before pelletizing, or alternatively, the anti-mushing agent may be mixed with the sodium chloride by applying it after pelletizing. After pelletizing the anti-mushing agent may be applied by spraying a solution of the anti-mushing agent or by dispersing the anti-mushing agent as by dusting. Significantly, when the pellets are in an aqueous medium, such as in a water softener, the anti-mushing agent may be dissolved in the aqueous medium.

Sodium hexametaphosphate or sodium metaphosphate in the invention have the highest and most beneficial activity. Sodium hexametaphosphate and sodium metaphosphate may be used in the invention when they comprise from about 0.01% to about 1% by weight based upon the total weight of the solid salt with 0.025 to 0.1% being preferred. Trisodium phosphate may be used in the invention when it is used at a level of about 1% to about 3% by weight based upon the weight of the solid salt; sodium tripolyphosphate may be used in the invention when it is used at a level of about 0.5% to about 3% by weight based upon the weight of the salt; and disodium ethylenediaminetetraacetic acid may be used in the invention when it is used at a level of about 0.5 to about 3% by weight of the salt.

As used herein anti-mushing means the prevention of the disintegration of solid sodium chloride, such as sodium chloride pellets having a mass of 3 g, into a shapeless mass with or without the application of small forces such as can be exerted by squeezing between human fingers after being submersed in an aqueous medium for two or more days. Accordingly, mush or mushing means the disintegration of solid sodium chloride, under such conditions.

Examples of the method and compounds of the invention are hereinafter described.

EXAMPLE 1

Sodium hexametaphosphate is mixed with granulated salt to comprise salt mixtures of (a) 0.11% by weight sodium hexametaphosphate based upon the weight of the salt and (b) 0.05% by weight sodium hexametaphosphate based upon the weight of the salt. Both mixtures (a) and (b) are pelletized with a press with 60% recycle. Two control samples of pelletized salt also are made. Pellets of mixture a, b and the control are put into water. Pellets from mixture (a) were tested for three weeks and did not mush; pellets from mixture (b) were tested for two weeks and did not mush; the control without additive according to the invention mushed during testing.

EXAMPLE 2

A number of materials were tested as potential additives with water softening sodium chloride pellets that were known to mush. In all cases the potential additive, the sodium chloride pellets and water were added to beakers and allowed to stand for 2-3 days. At the end of this time, an assessment of the efficacy of the material as an anti-mushing agent for solid sodium chloride was made by squeezing the pellets between the thumb and forefinger. The number of pellets that disintegrated under the finger pressure were recorded.
The results were:
(1) No additive - 10 out of 10 mushed
(2) 0.07% - 38% tetrasodium ethylenediaminetetraacetic acid, 0.04% Triton QS-44-5 out of 10 mushed
(3) 0.05% sodium metaphosphate-0 out of 10 mushed
(4) 0.025% sodium metaphosphate-1 out of 10 mushed
(5) 0.01% sodium metaphosphate-4 out of 10 mushed
(6) 0.05% sodium tripolyphosphate-8 out of 10 mushed
(7) 0.05% sodium acetate-10 out of 10 mushed
(8) 0.05% sodium propionate-9 out of 10 mushed
(9) 1% liquid bittern-7 out of 10 mushed
(10) 0.05% citric acid-7 out of 10 mushed
(11) 0.05 sodium hexametaphosphate+0.04% Triton QS 44-0 out of 10 mushed
(12) 0.05% sodium pyrophosphate-4 out of 10 mushed
(13) 0.05% sodium borate-9 out of 10 mushed
(14) 0.05 trisodium phosphate-5 out of 10 mushed
(15) 0.10%-50% sodium glucoheptonate, mixed isomer-10 out of 10 mushed
(16) 0.05% HEEDTA-7 out of 10 mushed
(17) 0.05% disodiumethylenediaminetetraacetic acid dihydrate-10 out of 10 mushed
(18) 0.05% ethylenediaminetetraacetic acid (acid)-10 out of 10 mushed
(19) 0.05% metaphosphoric acid-10 out of 10 mushed
(20) 0.1% disodium ethylenediaminetetraacetic acid dihydrate-9 out of 10 mushed
(21) 0.14% tetrasodium ethylenediaminetetraacetic acid, 38% solution-8 out of 10 mushed
(22) 0.05% potassium metaphosphate-10 out of 10 mushed
(23) 0.05% potassium dihydrogen phosphate-10 out of 10 mushed
(24) 0.05% sodium hypophosphite-10 out of 10 mushed
(25) 0.05% disodium phosphate-10 out of 10 mushed
(26) 0.05% sodium citrate-10 out of 10 mushed
(27) 0.035 sodium metaphosphate, 0 out of 10 mushed

EXAMPLE 3

The efficacy of sodium hexametaphosphate as an anti-mushing agent for solid sodium chloride was tested as $100\pm2$ grams of sodium chloride pellets having a mushing tendency were submerged in 50 grams of sodium hexametaphosphate solution with pellets being submerged in 50 grams of water as a control. The pellets were passed over a $\frac{3}{8}''$ sieve prior to use. The following solutions were added to the 100 grams of pellets, the percentages based upon the total weight of solution (as opposed to the weight of the salt). The mushing results were again determined by applying pressure to the pellets between the thumb and forefinger after 3 days of exposure to the solution.
(1) Plain water-8 pellets out of 10 mushed
(2) 6% sodium hexametaphosphate-0 out of 10 mushed
(3) 0.6% sodium hexametaphosphate-0 out of 10 mushed
(4) 0.06% sodium hexametaphosphate-0 out of 10 mushed
(5) 0.03% sodium hexametaphosphate-0 out of 10 mushed
(6) 0.01% sodium hexametaphosphate-5 out of 10 mushed
(7) 0.001% sodium hexametaphosphate-9 out of mushed

EXAMPLE 4

A number of materials were tested as potential anti-mushing additives as described below. The following potential additives at the indicated percentages were placed in a 250 ml beaker with 50 grams of water and $100\pm2$ grams of sodium chloride salt pellets. The percentage of potential additive was based on the salt weight. The pellets were allowed to stand in the aqueous medium over a 5 day period. Thereafter the pellets were withdrawn from the beaker and pressed between the thumb and forefinger to determine the number of pellets that mushed out of 10 selected at random from the beaker. The pH of the resultant brine was also measured to see if there way any trend between mushing and pH.

|  | pH of brine | # pellets that mushed of 10 sampled |
|---|---|---|
| (1) No additive | 5.8 | 10 |
| (2) 0.07%–38% tetrasodium ethylenediaminetetraacetic acid | 8.6 | 9 |
| (3) 0.3%–38% tetrasodium ethylenediaminetetraacetic acid | 10.4 | 9 |
| (4) 3.0%–38% tetrasodium ethylenediaminetetraacetic acid | 11.7 | 10 |
| (5) 0.04% Triton QS-44 | 1.6 | 7 |
| (6) 0.40% Triton QS-44 | 0.92 | 7 |
| (7) 0.1% HEEDTA | 10.0 | 8 |
| (8) 0.2% HEEDTA | 10.4 | 8 |
| (9) 1.0% HEEDTA | 11.3 | 9 |
| (10) 1.0% citric acid | 1.0 | 8 |
| (11) 2.0% citric acid | 0.80 | 8 |
| (12) 1.0% sodium citrate | 6.7 | 8 |
| (13) 2.0% sodium citrate | 7.5 | 8 |
| (14) 1.0% trisodium phosphate | 10.5 | 5 |
| (15) 3.0% trisodium phosphate | 10.6 | 2 |
| (16) 0.1% sodium tripolyphosphate | 6.5 | 9 |
| (17) 1.0% sodium tripolyphosphate | 6.8 | 1 |
| (18) 3.0% sodium tripolyphosphate | 6.8 | 1 |
| (19) 1.0% disodium ethylenediaminetetraacetic acid · 2H$_2$O | 3.4 | 1 |
| (20) 3.0% disodium ethylenediaminetetraacetic acid · 2H$_2$O | 3.5 | 1 |
| (21) 1.0% MgCl · 6H$_2$O | 5.0 | 9 |
| (22) 3.0% MgCl · 6H$_2$O | 5.1 | 8 |

What is claimed is:

1. A method of softening water and to prevent mushing and bridging of a plurality of solid pelletized sodium chloride pellets into a mass in an aqueous medium of a water softener, the method comprising:

mixing the sodium chloride pellets with the aqueous medium in the water softener, the sodium chloride pellets prepared by mixing from about 0.01 to about 3.0 percent by weight, based upon the weight of solid sodium chloride, of an anti-mushing agent with non-pelletized solid sodium chloride to provide a non-pelletized solid sodium chloride anti-mushing agent mixture, the anti-mushing agent selected from the group consisting of sodium hexametaphosphate, sodium metaphosphate, trisodium phosphate, sodium tripolyphosphate, disodium ethylenediaminetetraacetic acid or mixtures thereof; and pelletizing the non-pelletized solid sodium chloride anti-mushing mixture to provide pellets of the sodium chloride mixture which pellets will substantially maintain their shape in the aqueous medium of a water softener.

2. A method as recited in claim 1 wherein there is from about 0.01 to about 1.0 percent anti-mushing agent and the anti-mushing agent is sodium hexametaphosphate or sodium metaphosphate.

3. A method as recited in claim 1 wherein there is from about 1.0 to about 3.0 percent anti-mushing agent and the anti-mushing agent is trisodium phosphate.

4. A method as recited in claim 1 wherein there is from about 0.5 to about 3.0 percent anti-mushing agent and the anti-mushing agent is sodium tripolyphosphate.

5. A method as recited in claim 1 wherein there is from about 0.5 to about 3.0 percent by weight anti-mushing agent and the anti-mushing agent is disodium ethylenediaminetetraacetic acid.

6. A method of softening water and to prevent mushing and bridging of a plurality of solid pelletized sodium chloride pellets into a mass in an aqueous medium of a water softener, the method comprising:

mixing an anti-mushing agent with the aqueous medium of the water softener containing the plurality of sodium chloride pellets, the anti-mushing agent selected from the group consisting of sodium hexametaphosphate, sodium metaphosphate, trisodium phosphate, sodium tripolyphosphate, disodium ethylenediaminetetraacetic acid or mixtures thereof so that the sodium chloride pellets will substantially maintain their shape in the aqueous medium of the water softener, the anti-mushing agent present in an amount from about 0.01 to about 3.0 percent by weight based upon the weight of sodium chloride pellets.

7. A method as recited in claim 6 wherein there is from about 0.01 to about 1.0 percent anti-mushing agent and the anti-mushing agent is sodium hexametaphosphate or sodium metaphosphate.

8. A method as recited in claim 6 wherein there is from about 1.0 to about 3.0 percent anti-mushing agent and the anti-mushing agent is trisodium phosphate.

9. A method as recited in claim 6 wherein there is from about 0.5 to about 3.0 percent anti-mushing agent and the anti-mushing agent is sodium tripolyphosphate.

10. A method as recited in claim 6 wherein there is from about 0.5 to about 3.0 percent by weight anti-mushing agent and the anti-mushing agent is disodium ethylenediaminetetraactic acid.

11. A method as recited in claim 6 wherein there is from about 0.025 to about 0.1 percent anti-mushing agent and the anti-mushing agent is sodium hexametaphosphate.

12. A method of softening water and to prevent mushing and bridging of a plurality of solid sodium chloride pellets into a mass in an aqueous medium of a water softener which includes an ion exchange material, the method comprising:

mixing an anti-mushing agent and the plurality of solid sodium chloride pellets with the aqueous medium of the water softener, the anti-mushing agent selected from the group consisting of sodium hexametaphosphate, sodium metaphosphate, trisodium phosphate, sodium tripolyphosphate, disodium ethylene diaminetetraacetic acid or mixtures thereof so that the sodium chloride pellets will substantially maintain their shape in the aqueous medium, the anti-mushing agent present in an amount from about 0.01 to about 3.0 percent by weight based upon the weight of sodium chloride pellets.

13. A method as recited in claim 12 wherein the anti-mushing agent and sodium chloride are mixed, then pelletized into a plurality of pellets which plurality of pellets are mixed with the aqueous medium of the water softener, the plurality of pellets resisting mushing and substantially maintaining their shape after being submersed in the aqueous medium of the water softener for at least two days.

* * * * *

UNITED STATES PATENT AND TRADEMARK OFFICE
CERTIFICATE OF CORRECTION

PATENT NO. : 4,992,208
DATED : February 12, 1991
INVENTOR(S) : Donald T. Ireland It is certified that error appears in the above-identified patent and that said Letters Patent is hereby corrected as shown below:

Column 3, line 59, after "as" insert
--follows--

Signed and Sealed this

Twenty-third Day of February, 1993

Attest:

STEPHEN G. KUNIN

*Attesting Officer*    *Acting Commissioner of Patents and Trademarks*